United States Patent
Kruse et al.

[11] Patent Number: 5,389,052
[45] Date of Patent: Feb. 14, 1995

[54] METHOD OF REGULATING AND CONTROLLING SHIFTING OF GEARS IN AN AUTOMATIC TRANSMISSION TO ENHANCE COMFORT

[75] Inventors: Georg Kruse, Gifhorn; Norbert Ramm, Braunschweig, both of Germany

[73] Assignee: Volkswagen AG, Wolfsburg, Germany

[21] Appl. No.: 65,566

[22] Filed: May 21, 1993

[30] Foreign Application Priority Data

May 22, 1992 [DE] Germany ............... 4217004

[51] Int. Cl.6 ............................................. F16H 59/00
[52] U.S. Cl. ..................................... 477/121; 477/902
[58] Field of Search ............... 74/335, 857; 364/424.1; 477/121, 138, 902

[56] References Cited

U.S. PATENT DOCUMENTS

| | | | |
|---|---|---|---|
| 4,102,222 | 7/1978 | Miller et al. ........................ | 74/866 |
| 4,702,127 | 10/1987 | Cote ................................. | 74/335 X |
| 4,776,239 | 10/1988 | Sassi et al. ........................ | 74/335 X |
| 5,047,935 | 9/1991 | Kashihara ........................ | 364/424.1 |
| 5,065,849 | 11/1991 | Kono et al. ................... | 364/424.1 X |
| 5,138,905 | 8/1992 | Kouno ............................. | 74/335 X |

FOREIGN PATENT DOCUMENTS

| | | | |
|---|---|---|---|
| 3621674 | 8/1987 | Germany . | |
| 4023365 | 1/1992 | Germany . | |
| 0244719 | 10/1987 | Japan ................................. | 74/335 |
| 1004543 | 1/1989 | Japan ................................. | 477/121 |

Primary Examiner—Edward K. Look
Assistant Examiner—Hoang Nguyen
Attorney, Agent, or Firm—Brumbaugh, Graves, Donohue & Raymond

[57] ABSTRACT

To improve shifting comfort in an automatic transmission, the transmission output shaft torque is kept as nearly constant as possible during the shifting operation by detecting, prior to and during the entire shift operation, the engine speed, the transmission input shaft speed and torque and the transmission output shaft torque or the torque of the drive wheels, and controlling the engagement and disengagement of transmission elements in accordance with those variables.

3 Claims, 3 Drawing Sheets

METHOD OF REGULATING AND CONTROLLING SHIFTING OF GEARS IN AN AUTOMATIC TRANSMISSION TO ENHANCE COMFORT

BACKGROUND OF THE INVENTION

This invention relates to regulation and control of the shifting of gears in automatic transmissions to enhance comfort.

It is generally known that there are variations of torque associated with the shifting operation in automatic transmissions which cannot be completely eliminated even in transmissions with automatic load shifting arrangements. The operator of a vehicle having such a transmission experiences these torque variations during the shifting operation as more or less pronounced jerks on the part of the vehicle. The cause of the brief acceleration which produces each jerk of the vehicle is the engagement and disengagement of clutches and brakes during each shifting of gears which heretofore have been only imperfectly matchable to each other.

In U.S. Pat. No. 4,102,222, it has been proposed, in order to achieve a noncoasting automatic transmission with improved shifting comfort, that a regulation and control system be provided in which the optimum point in time for disengaging the clutch of the previous gear is determined as a function of the measured transmission output shaft torque and the engine torque. This firstly serves to protect the shift elements to be engaged and secondly minimizes the unavoidable interruption in the driven shaft torque.

A disadvantage of this regulation and control system is that, while avoiding the need for coasting, it renders only the commencement of the shifting operation more comfortable since continuous uniformity of transmission output shaft torque is not attainable with this arrangement.

To improve the shifting comfort and hence the riding quality, German Offenlegungsschrift No. 40 23 365 proposed evaluating the quality of shifting during the operation of an automatic transmission by detecting quantities dependent on torque variations so that, after one shift operation, the shift parameters for controlling the transmission and/or the shifting components might be matched so as to optimize the next shifting operation. In this way, shift quality is improved with each shift operation by a process of trial and error.

A disadvantage of this method is that such improved transmission shifting requires a more or less prolonged breaking-in process for learning the optimum shift operation for each driving situation, since only approximately similar driving situations will result in optimally smooth shifting with the aid of learned situation-related control parameters. If such a lengthy breaking-in process is to be avoided, then it must be accepted that shift operations of diverse quality will occur throughout the life of the transmission.

SUMMARY OF THE INVENTION

Accordingly, it is an object of the present invention to provide a method for regulating and controlling the shifting of gears in an automatic transmission to enhance comfort which overcomes the disadvantages of the prior art.

Another object of the invention is to improve still further the shifting comfort of an automatic transmission with respect to conventional methods of control.

These and other objects of the invention are attained by detecting the engine speed, the transmission input shaft speed, the transmission input shaft torque and the transmission output shaft torque or related quantities and controlling the operation of shifting elements within the transmission in response to changes in one or more of the engine speed and transmission input shaft speed and torque and the transmission output shaft torque so as to maintain the output shaft torque as nearly constant as possible during each shifting operation. Thus, the invention is based on the recognition that, to optimize shifting comfort, regulation of the control parameters for the shifting elements is required during the entire shift operation. This regulation makes use of situation-dependent variables which are detected during the course of the shift operation and utilized to vary the control parameters for the shifting elements.

As situation-dependent variables, the transmission output shaft torque or the torque at a driven wheel of the vehicle may be used. These may be determined directly or from variables which are dependent on output shaft torque.

To initiate the shift operation, use is made of data representing engine speed, transmission input shaft speed and transmission input shaft torque, as in the prior art.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENT

Figure 1:
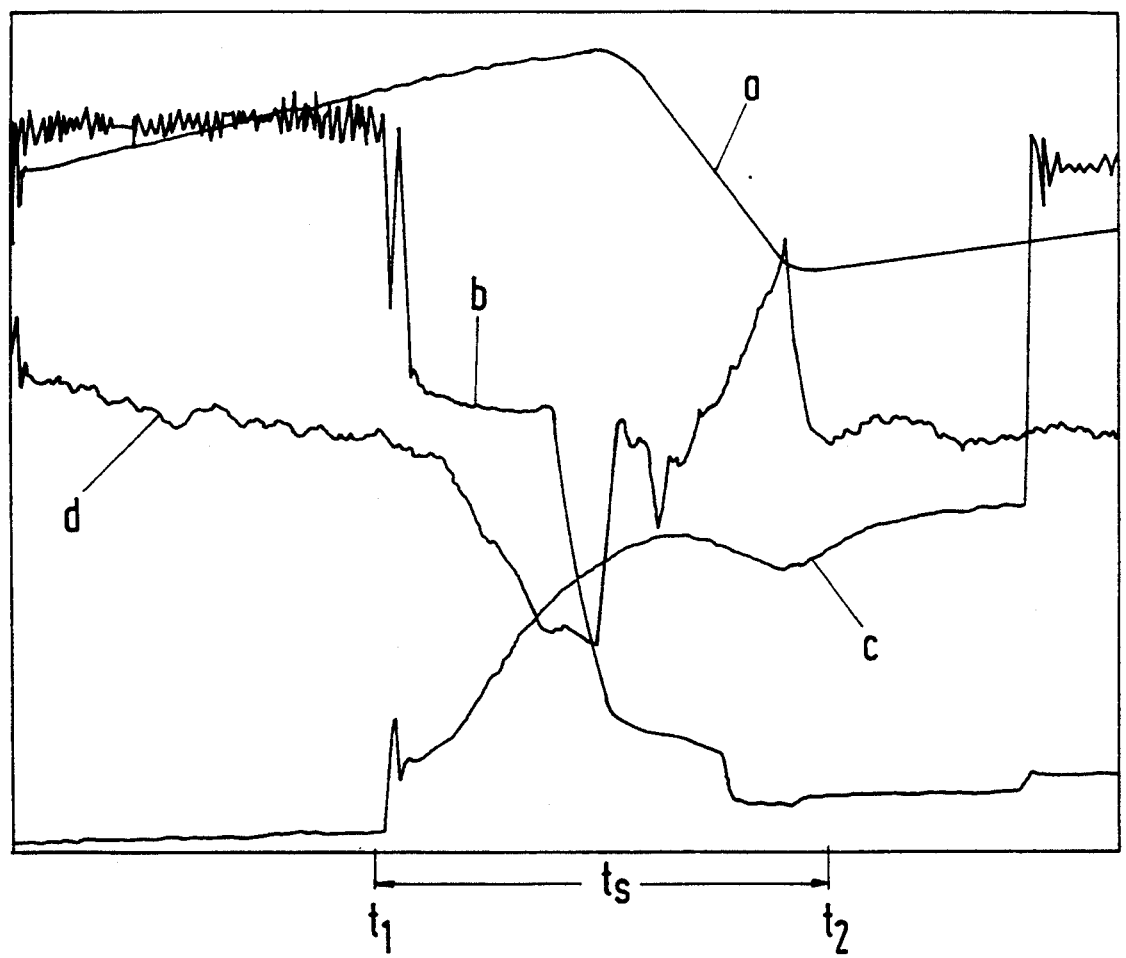
FIG. 1 is a schematic graphical representation showing variations in torque, engine speed, shift pressure of an old gear clutch element and shift pressure of a new gear clutch element as relative functions of time in an unregulated upshift operation during a time interval $t_s$ according to the prior art.

In the unregulated shift operation of the prior art from one gear to the next gear as shown in FIG. 1, a stepwise reduction of the control pressure of the clutch of the old gear, represented by the curve b, begins at the time $t_1$. At the same time, a slow rise of the control pressure for the clutch of the new gear, represented by the curve c, also begins at the time $t_1$. Parallel with this, there is a continued increase in engine speed, represented by the curve a, as well as a continued decline of the torque delivered by the transmission output shaft, represented by the curve d.

After an elapse of about half of the shift time interval $t_s$ and a further reduction in the clutch pressure for the old gear, the clutch of the new gear is more strongly engaged, which reduces the engine speed upon shifting up, as shown by the curve a. This phase of the shift operation is characterized by a sharp rise in the transmission output shaft torque d, which then declines rapidly again upon even stronger engagement of the clutch for the new gear.

This rapid rise and fall in the transmission output shaft torque curve d during the second half of the shift time $t_s$ is experienced by the occupants of a vehicle equipped with such a transmission as poor shifting comfort. The shape of the torque curve d is not constant, but depends on the particular gear change selected (for example, a shift from second gear to third gear), the condition of the engine and transmission components, environmental conditions of the vehicle, and the driving situation (for example, driving on a level road or on a hill).

Figure 2:
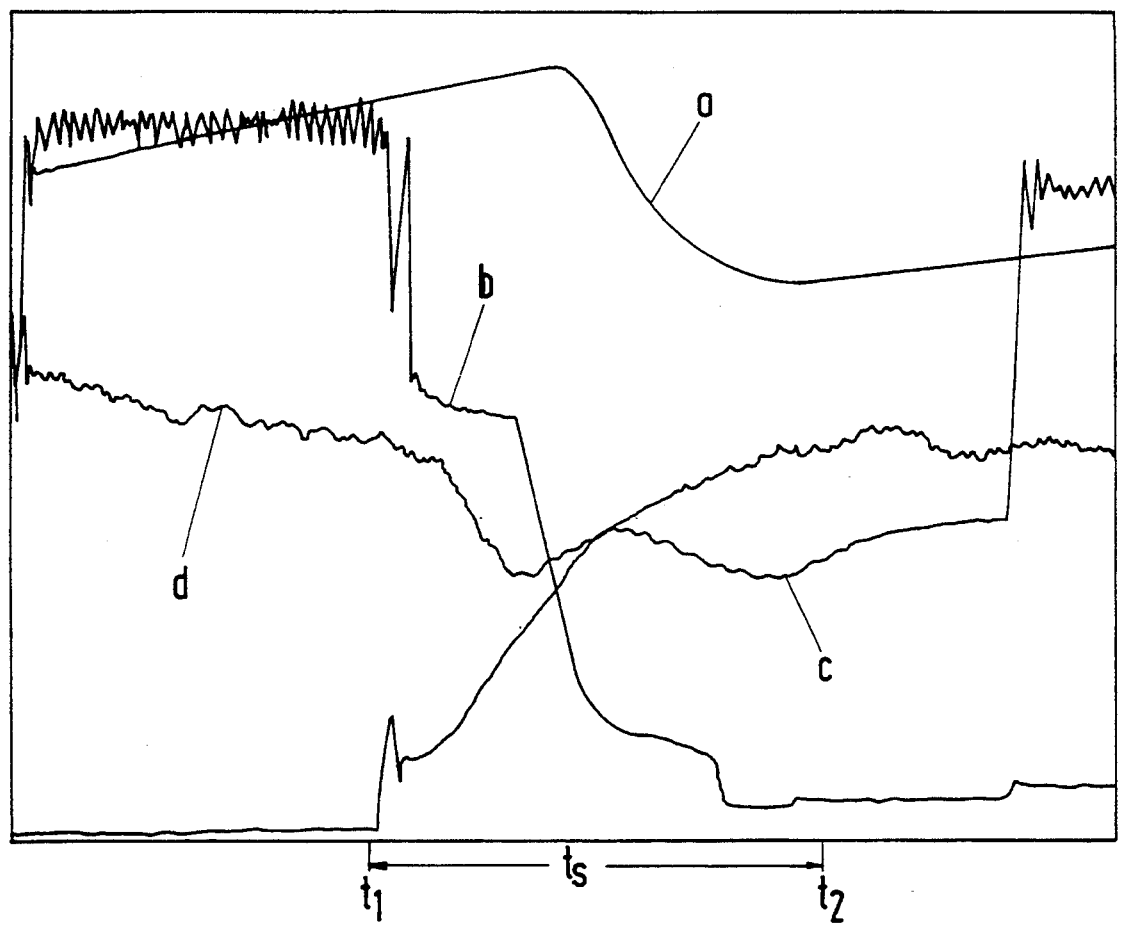
FIG. 2 is a schematic graphical representation showing the relative behavior of the same parameters illustrated in FIG. 1 during a shift operation carried out according to the method of the present invention.

The graph of FIG. 2 illustrates the changes in these variables during upshifting of the same transmission in the same driving situation, the same environmental conditions, full throttle, and shifting from second to third gear, but when the shifting is regulated according to the invention.

As in FIG. 1, the transmission control commences the shift operation at the time $t_1$ as soon as the engine speed has reached a certain level, but each of the quantities is also detected during the period preceding $t_1$. During the stepwise reduction of the control pressure of the clutch of the previous gear, represented by curve b, and the increase of the control pressure for the clutch of the new gear, represented by the curve c, the regulation and control system monitors the output shaft torque of the transmission and/or the torque of the drive wheels.

In response to these torque measurements, optimum comfort control parameters are selected during the shift operation for controlling the operation of brakes and clutches in the transmission, either by increasing or decreasing the control pressure. The increased or reduced assumption of the load by the clutch for the new gear or the old gear, compared to the unregulated shift operation of FIG. 1, effects a generally harmonious torque function as shown by the curve d and this also occurs upon reduction of the engine speed shown in the curve a. As a result, the occupants of the vehicle will experience only a barely perceptible jerk during the shift operation.

Since this regulation and control method for shift operations in transmissions is immediately functional, and no extra "learning" shift operations are required, the driver of a vehicle experiences a substantial enhancement of shifting comfort. This is especially true because the shifting operation is controlled from the outset with all types of shift operations and there are no "learning" shift operations occurring repeatedly during the life of the vehicle with the disadvantageous jerky accelerations during each new shifting condition.

Figure 3:
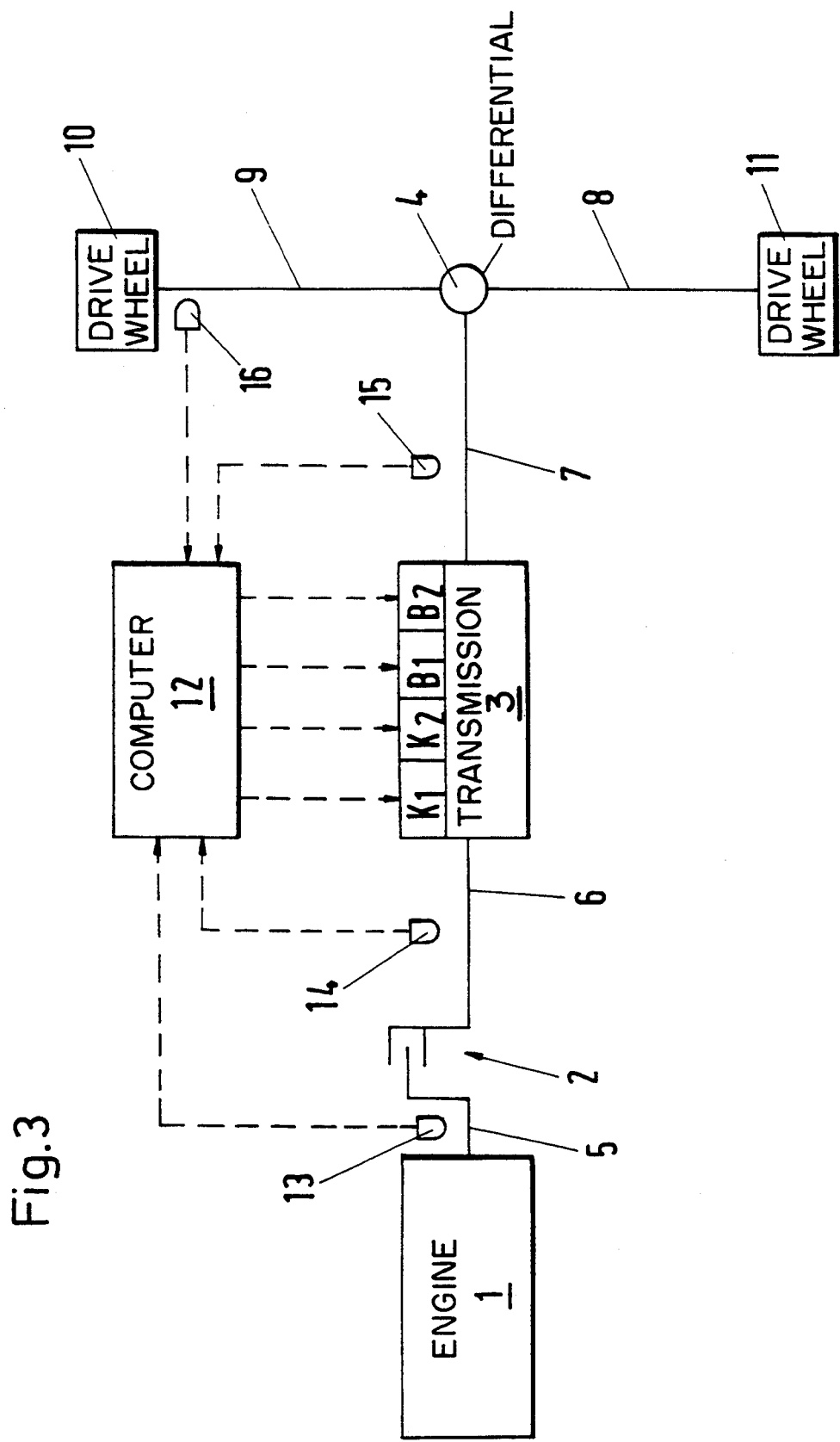
FIG. 3 is a schematic diagram illustrating the relevant components of a representative motor vehicle transmission and drive train arranged to carry out the method of the present invention.

The method according to the invention is used in the transmission control of a motor vehicle propulsion system of the type shown schematically in FIG. 3. The propulsion system comprises an engine 1 having a crankshaft 5 connected by way of a hydraulic coupling 2 to the input shaft 6 of a transmission 3. The transmission 3 is an automatic shift transmission in which a plurality of electrohydraulically actuatable elements, represented as four clutches and brakes, $K_1$, $K_2$, $B_1$ and $B_2$, are engaged and disengaged to actuate various gear elements. The transmission 3 in this embodiment is connected by way of an output shaft 7 to a differential gear 4 connected through two driven shafts 8 and 9 to corresponding driven wheels 10 and 11.

To control the shift operations of the transmission 3, a computer 12 receives input signals continuously as indicated by dotted lines from a number of sensors 13–16 as described hereinafter. In addition, the computer 12 controls an electrohydraulic coupling, not shown but familiar to those skilled in the art, for engaging or disengaging the transmission elements $K_1$, $K_2$, $B_1$ and $B_2$.

As described above, the method of the invention provides an improvement in the shifting comfort of a transmission in comparison with conventional transmission control methods. For this purpose, and this is especially important, the torque of the output shaft of the transmission is kept as nearly constant as possible during the shifting operation. To accomplish this, variables dependent on the driving situation are determined by the computer 12 prior to and throughout the shifting operation and the shift elements $K_1$, $K_2$, $B_1$ and $B_2$ are controlled by the computer so as to keep the torque of the transmission output shaft 7 essentially constant.

To control the shifting of the transmission, the computer 12 utilizes the engine speed, obtained by a sensor 13, the transmission input shaft speed and torque, measured by a sensor 14, and the transmission output shaft torque, determined by a sensor 15. Instead of transmission output shaft torque, a sensor 16 may be arranged to detect the torque at the driven wheels 10 and 11 in order to control shifting of the transmission.

The regulating and control computer 12 detects the engine speed continuously by the sensor 13. As soon as a certain level is reached, the computer 12 begins to reduce the control pressure in the old gear to be disengaged and to increase the control pressure in the new gear to be engaged. Load changes dependent on driving situations that may adversely affect the shifting operation are identified by the torque sensors 15 and/or 16 on the output side of the transmission and further processed to establish an especially smooth and comfortable shifting operation. Thus, if a sudden load change occurs during the shifting operation, it can be identified on the output side by the computer 12 and a correction can be made in the control pressure of the shift element to be disengaged and/or engaged.

Although the invention has been described herein with reference to a specific embodiment, many modifications and variations therein will readily occur to those skilled in the art. Accordingly, all such variations and modifications are included within the intended scope of the invention.

We claim:

1. A method for enhancing shifting comfort in a vehicle having an engine during operation of an automatic transmission having an input shaft and an output shaft and having shift elements for controlling engagement and disengagement of gears in the transmission comprising detecting quantities representative of engine speed, transmission input shaft speed, transmission input shaft torque and transmission output shaft torque or variables which depend on transmission output shaft torque and controlling the shift elements in accordance with at least one of the quantities representative of engine speed, transmission input shaft speed, transmission input shaft torque and transmission output shaft torque or variables of it to provide reduced variations in transmission output shaft torque during shifting operations.

2. A method according to claim 1 including detecting a quantity representative of the transmission output shaft torque by detecting torque of a driven wheel of the vehicle.

3. A method according to claim 2 including detecting quantities representative of at least one of the engine speed, the transmission input shaft speed and the transmission input shaft torque prior to and commencement of a shift operation.

* * * * *